Figure 1:
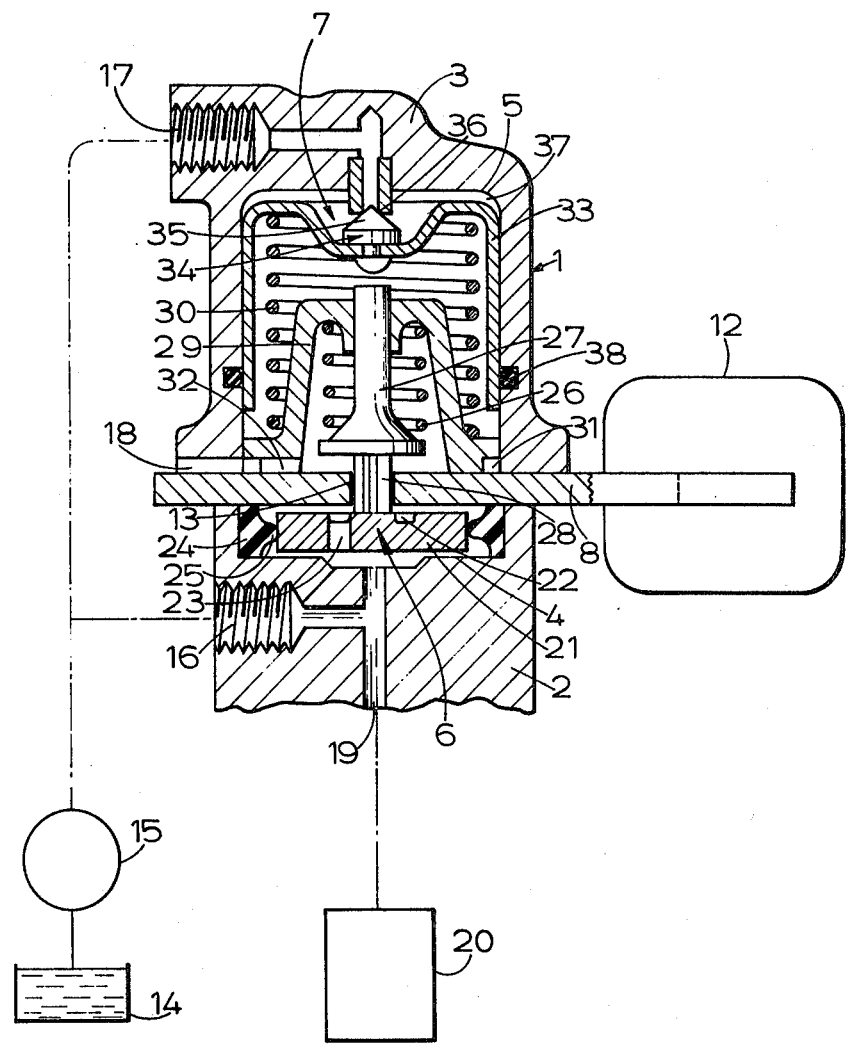

United States Patent [19]

Harrison

[11] 4,446,882

[45] May 8, 1984

[54] SOLENOID-OPERATED VALVE MEANS FOR HYDRAULIC SYSTEMS

[75] Inventor: Anthony W. Harrison, Birmingham, England

[73] Assignee: Lucas Industries Limited, Birmingham, England

[21] Appl. No.: 313,216

[22] Filed: Oct. 20, 1981

[30] Foreign Application Priority Data

Nov. 1, 1980 [GB] United Kingdom ............... 8035193

[51] Int. Cl.³ .......................................... F16K 31/04
[52] U.S. Cl. .................................. 137/115; 137/467; 137/882; 251/141; 417/305
[58] Field of Search .................... 137/115, 467, 882; 251/141; 417/305

[56] References Cited

U.S. PATENT DOCUMENTS 2,474,772  6/1949  Ashton ................................. 137/115

*Primary Examiner*—Gerald A. Michalsky

*Attorney, Agent, or Firm*—Scrivener, Clarke, Scrivener and Johnson

[57] ABSTRACT

In an hydraulic system a solenoid-operated valve mechanism is used to control delivery of pressure fluid to a part of the system, the fluid being circulated by a pump from a reservoir through the valve mechanism and back. The valve mechanism has a solenoid-operated valve biassed open, and closed when the solenoid is energized to generate pressure fluid, the valve then being operated in response to the pressure and a pressure-responsive valve-opening mechanism, such that when the pressure rises above a first threshold level the pressure acts to keep the valve closed, until the pressure reaches a second threshold level at which the valve-opening mechanism is operative to cause the valve to open provided the solenoid is de-energized. The valve-opening mechanism comprises a valve which opens at the second threshold level to allow pressure fluid into a cavity defined by a piston to cause the pressure to fall and the valve to open.

8 Claims, 2 Drawing Figures

SOLENOID-OPERATED VALVE MEANS FOR HYDRAULIC SYSTEMS

SPECIFIC DESCRIPTION

This invention relates to a solenoid-operated valve means for hydraulic systems of the kind controlling the delivery of pressure fluid to a part of the system by controlling the flow of fluid circulated from a reservoir, through the solenoid-operated valve means and back to the same or to a different reservoir by means of a continuously driven pump.

Normally the pump displaces fluid from the reservoir through suction and delivery passages and the solenoid-operated valve means back to the reservoir. The solenoid-operated valve means is operative to close and open the passage back to the reservoir so that the pump generates pressure fluid for delivery to the part of the system. Such valve means are used in high pressure vehicle suspension levelling systems to deliver pressure pulses to a fluid pressure manifold in order to increase or decrease pressure in the hydraulic suspension struts as required. However in such a high pressure system the solenoid-operated valve means controlling the pressure pulses must also be able to deal with the fluid pressure that this generates. Thus, in general, the solenoid-operated valve means will be heavy, and will require a relatively large current to operate it.

According to our invention a solenoid-operated valve means of the kind set forth comprises a solenoid-operated valve which is urged open, with energisation of the solenoid being operable to close the valve to cut off the return fluid flow to the reservoir so that the pump generates pressure fluid for delivery to the part of the system, the valve then also being operated in response to the pressure generated by the pump and a valve-opening means responsive to the pump pressure, such that when the pump pressure rises above a first threshold level the pump pressure acts to keep the valve closed regardless of the state of the solenoid, until the pump pressure reaches a second threshold level at which the valve-opening means is operative to cause the valve to open provided that the solenoid is deenergised.

As the pump pressure acts to keep the valve closed rather than open, the solenoid is required to close the valve only against the force normally urging it open, which is relatively small in comparison with the pump pressure. Thus the solenoid only uses a small amount of current for its operation, and the valve can be much lighter.

The valve-opening means is operative at the second threshold level to allow pressure fluid into a cavity to cause the pump pressure to fall. The cavity is preferably defined by a movable member on which the pump pressure acts at the second threshold level.

Preferably the valve-opening means includes a second valve which is normally biassed to closure, and which opens when the pump pressure reaches the second threshold level to allow pressure fluid into the cavity.

In one embodiment the valve member of the second valve is attached to the movable member and at the second threshold level the pressure fluid leaks through the second valve to act on the member, which is then operative to open the second valve fully, allowing pressure fluid into the cavity.

In this embodiment the operation of the valve-opening means in allowing pressure fluid into the cavity causes the pump pressure to fall below the first threshold level to allow the solenoid-operated valve to open.

In a modification, movement of the movable member is operative to open the solenoid-operated valve directly.

In a further modification the valve-opening means comprises a movable member on which the pump pressure acts, and at the second predetermined level movement of the piston acts to open the solenoid-operated valve directly. This modification is more suitable for systems with a lower maximum pressure, where the springloading for the piston is not unreasonably large.

The movable member conveniently comprises a springloaded piston.

The solenoid-operated valve comprises a valve disc adapted to seal an aperture in a pole plate energised by a solenoid coil, the valve disc being attached to a valve rod on which the valve-opening means can work in order to open the valve directly.

Figure 2:
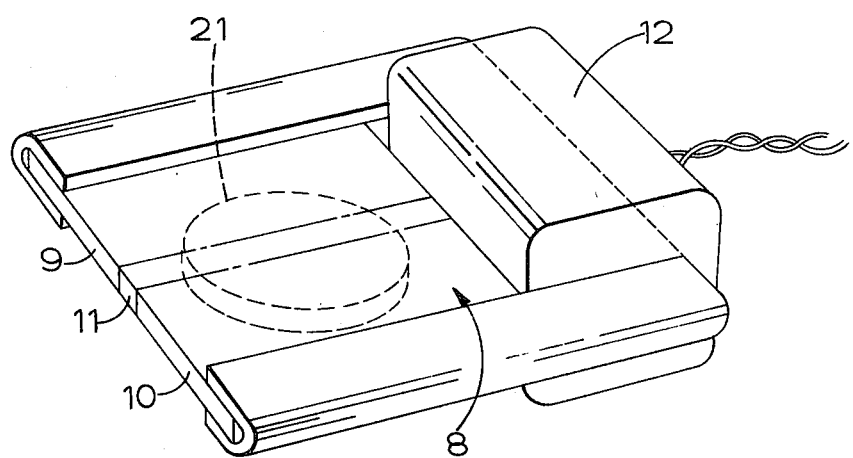

One embodiment of our invention is illustrated by way of example in the accompanying drawings, in which:

FIG. 1 is a cross-section of a solenoid-operated valve means for an hydraulic system, part of which is shown schematically in the Figure; and FIG. 2 is a perspective view showing a magnetic pole plate for the valve means of FIG. 1.

The valve means 1 of FIG. 1 comprises a housing formed in two parts 2, 3 each being provided with a respective cavity 4, 5. The housing parts 2, 3 are of non-magnetic material such as an aluminium alloy, and house the solenoid-operated valve 6 and the valve-opening means 7.

A magnetic pole plate 8 is located between the two housing parts 2, 3, and the housing is held together by studs (not shown). The magnetic pole plate 8 (as shown in FIG. 2) has two pole regions 9, 10 which are of soft iron separated by an element 11 of austenitic stainless steel which is welded to the pole regions by electron beam or laser welding to maintain the hydraulic soundness of the pole plate 8. The pole plate 8 can be energised by a solenoid coil 12. The pole plate 8 is also provided with an aperture 13 through which the cavities 4, 5 in the housing are in communication. The housing is also provided with fluid inlet and outlet ports by which it is connected to the hydraulic system, part of which is shown in FIG. 1. The system includes a fluid reservoir 14, from which fluid is displaced by a continuously driven pump 15 and delivered to inlet ports 16, 17 in the housing. Fluid from inlet port 16 is returned to the reservoir 14 via an outlet port 18 in the housing and connections which are not shown. A further outlet port 19 in the housing leads to a part 20 of the system to which pressure fluid is delivered under the control of the solenoid-operated valve 6.

Communication between the inlet port 16 and the outlet port 18 through the aperture 13 is controlled by the solenoid-operated valve 6. The valve 6 comprises a disc valve member 21 of magnetic material adapted to seat against the pole plate 8 to close the aperture 13. The valve member 21 has an annular channel 22 defining the seat area, and one or more axial passages 23 allowing fluid flow when the valve is open. The cavity 4 is sealed by an annular seal 24, which is provided with an internal annular projection 25 which is operative to locate the valve member 21. The valve member 21 is normally held away from its seat by a spring 26 acting through a valve push rod 27. The portion 28 of the push rod 27 located in the aperture 13 is grooved to allow fluid flow through the aperture while the valve is open. At their ends remote from the pole plate 8 the spring 26 and the rod 27 are located by a cup member 29 which is urged by a spring 30 into engagement with the pole plate 8. The cup member 29 is provided at its end adjacent the pole plate 8 with an annular groove 31 and a radial passage 32 to allow fluid flow from the aperture 13 to the outlet port 18. The push rod 27 and the cup member 29 are of non-magnetic material, preferably a thermosetting plastics material, so that the magnetic path produced by energisation of the coil 12 passes only through the pole regions 9, 10 and the valve member 21.

The spring 30 also acts on a hollow piston member 33, which comprises part of the valve-opening means 7, to urge it towards the upper end of the cavity 5. The valve-opening means 7 also has a second valve member 34 carried by piston 33. The valve member 34 has a conical seat portion 35 which is adapted to seat on a valve seat 36 pressed into the housing part 3. The seat 36 is of steel, and the second valve member 34 is of hardened steel. The second valve member 34 is exposed to the pressure at the inlet port 17, and at a predetermined level of pressure will allow fluid to leak into a cavity 37, formed between the housing wall and the piston 33 at the upper end of the cavity 5, to act on the piston 33. Fluid leakage past the piston 33 is prevented by a seal 38. The clearance between the piston 33 and the housing wall near the seal 38 is minimal to prevent extrusion of the seal due to the hydraulic pressure, but at the closed end of the piston 33 the clearance between the piston and the housing is larger so that the valve member 34 can centre itself on the seat 36 even though the seat 36 and the valve member 34 may not be exactly concentric.

In operation, when pressure fluid is not required at the part 20, the solenoid-operated valve 6 is open, and the second valve is closed. Fluid is pumped from the reservoir 14 to the inlet ports 16 and 17, and flows through the open valve 6 to the outlet port 18 and back to the reservoir 14.

When pressure fluid is required at the part 20, the solenoid coil 12 is energised, and the valve member 21 closes the aperture 13 to cut off the return flow to the reservoir 14. The pressure generated by the pump 15 therefore rises, and the pressure is delivered from the outlet port 19 to the part 20. At a first threshold level the pump pressure will be sufficient to hold the valve member 21 closed against the spring 26, and so the solenoid coil 12 is de-energised.

The pump pressure also acts at the inlet port 17 and on the second valve member 34 against the force in the spring 30, which is stronger than the spring 26. At a second threshold level of pressure the second valve member 34 will allow fluid to leak into the cavity 37 to act on the piston 33. Movement of the piston 33 in response to the fluid pressure in the cavity 37 will cause the second valve to open fully so that the pressure in the cavity 37 becomes substantially equal to the pump pressure. The piston 33 moves until the forces on either side of the piston 33 are equalised, and movement of the piston 33 increases the volume of the cavity 37, causing the pump pressure to fall substantially. The pressure to which the pump pressure falls will be determined by the ratio of the area of the second valve seat 36 to the area of the piston 33, and by the change in the force in the spring 30 due to movement of the piston 33. The pressure to which the pump pressure falls is chosen so that it is below the first threshold level, enabling the spring 26 to open the valve 6, allowing fluid to return to reservoir 14.

In this embodiment the length of the push rod 27 is such that, with the valve 6 closed, the second valve will open fully before pushing the valve 6 open. In a modification, however, the movement of the piston 33 may be used to open the valve 6 directly, by providing a smaller clearance between the push rod 27 and the second valve member 34. In this case the pump pressure need not fall to a level below the first threshold level in order to open the valve 6.

In a further modification the second valve is omitted, and the pump pressure acts directly on the piston 33. When the second threshold level is reached the piston 33 moves, and acts directly to open the valve 6. This modification is suitable only for systems with a low maximum pressure, since with high pressures the loading in the spring 30 is excessive.

What is claimed is:

1. A solenoid-operated valve means for an hydraulic system, said system including at least one reservoir for fluid, a continuously-driven pump, and a part to which fluid under pressure is delivered, said solenoid-operated valve means being operative to control delivery of fluid under pressure to said part by controlling flow of fluid circulated by operation of said pump from said reservoir or one said reservoir through said solenoid-operated valve means and back to said reservoir or a different one of said reservoirs, said solenoid-operated valve means comprising a valve operated by a solenoid, said valve being urged open, energisation of said solenoid being operable to close said valve to cut off said return fluid flow to said reservoir, whereby said pump generates pressure fluid for delivery to the part of said system, said valve then also being operated in response to the pressure generated by said pump, and a valve-opening means responsive to said pump pressure, such that when said pump pressure rises above a first threshold level said pump pressure acts to keep said valve closed regardless of the state of said solenoid, until said pump pressure reaches a second threshold level at which said valve-opening means is operative to cause said valve to open, provided that said solenoid is de-energised.

2. A solenoid-operated valve means as claimed in claim 1, wherein said valve-opening means is operative at said second threshold level to allow pressure fluid into a cavity to cause said pump pressure to fall.

3. A solenoid-operated valve means as claimed in claim 2, wherein said cavity is defined by a movable member on which said pump pressure acts at said second threshold level.

4. A solenoid-operated valve means as claimed in claim 2 or claim 3, wherein said valve-opening means includes a second valve, said second valve being normally closed and said second valve opens when said pump pressure reaches said second threshold level to allow pressure fluid into said cavity.

5. A solenoid-operated valve means as claimed in claim 3, wherein said valve-opening means includes a second valve, said second valve being normally closed and opening when said pump pressure reaches said second threshold level to allow pressure fluid into said cavity, said second valve having a valve member, and said valve member of said second valve being attached to said movable member and at said second threshold level the pressure fluid leaks through said second valve to act on said movable member, said movable member then being operative to open said second valve fully allowing pressure fluid into said cavity.

6. A solenoid-operated valve means as claimed in claim 2 or claim 5, wherein said the operation of said valve-opening means to allow pressure fluid into said cavity causes said pump pressure to fall below said first threshold level to allow said solenoid-operated valve to open.

7. A solenoid-operated valve means as claimed in claim 3, wherein said movable member comprises a springloaded piston.

8. A solenoid-operated valve means as claimed in claim 1, wherein said solenoid has a solenoid coil and a pole plate energisable by said coil, said plate having an aperture, and said solenoid-operated valve comprises a valve disc adapted to seal against said aperture, said valve disc being attached to a valve rod on which said valve-opening means is adapted to work in order to open said valve directly.

* * * * *